United States Patent [19]

Stachler

[11] Patent Number: 5,024,332

[45] Date of Patent: Jun. 18, 1991

[54] NON-SMEAR ERASABLE LABEL KIT

[76] Inventor: Richard J. Stachler, 11647 Red Gulch Ct., Gold River, Calif. 95679

[21] Appl. No.: 563,109

[22] Filed: Aug. 6, 1990

[51] Int. Cl.$^5$ .............................................. B65D 85/00
[52] U.S. Cl. .................................. 206/575; 206/214; 206/232; 206/387; 206/459; 283/81; 434/408; 434/410
[58] Field of Search ............... 206/575, 214, 232, 387, 206/459; 434/408, 410; 283/81

[56] References Cited

U.S. PATENT DOCUMENTS

| | | |
|---|---|---|
| 4,507,883 | 4/1985 | Tarrani . |
| 4,589,685 | 5/1986 | Lazar . |
| 4,674,771 | 6/1987 | Thompson, II . |
| 4,757,901 | 7/1988 | Woods . |
| 4,813,711 | 3/1989 | Bohlman . |
| 4,884,827 | 12/1989 | Kelley . |

FOREIGN PATENT DOCUMENTS 2055702 3/1981 United Kingdom .
2190631 11/1987 United Kingdom .

Primary Examiner—William I. Price
Attorney, Agent, or Firm—John P. O'Banion

[57] ABSTRACT

A method and apparatus for placing identifying information on video cassettes, computer floppy disks, containers, file folders, and the like, whereby the identifying information is erasable. The apparatus comprises a kit with vinyl coated labels and a marking pen containing water soluble ink. When applied to the labels, the ink is smear-resistant, smudge-resistant, and highly resistant to erasure under normal handling. The ink is removed from the label by wiping the label with a damp cloth or similar material, thereby making the label reusable.

8 Claims, 1 Drawing Sheet

NON-SMEAR ERASABLE LABEL KIT

BACKGROUND OF THE INVENTION

This invention pertains to erasable labels generally and more specifically to labels for video cassettes, computer floppy disks, file folders, and the like where smear-proof erasable marking is desired.

Many items such as video cassettes, computer floppy disks, and file folders are re-used because the expense of disposing of the item is unacceptable. Video cassettes and computer floppy disks are specifically designed to be used over and over to record programs and data.

Since the contents of video cassettes and computer floppy disks cannot be viewed without the aid of a machine or device, labels are used to indicate the contents cassette or disk. Labels commonly available are affixed with adhesive and are non-removable. To change the marking on those labels, it is necessary to scratch out or write over the information. Alternatively, another label can be affixed over the original label. Where labels are removable, the label must be removed and discarded thereby adding to the expense of relabelling the item.

Several types of labelling means have been developed to overcome this problem. For example, U.S. Pat. No. 4,757,901, issued to Woods on July 19, 1988, describes an erasable label kit for video cassettes, computer disks, and the like which comprises self adhesive polyester film labels, a dry-erase marker pen, an erasing having polyester pile fabric, and a container for holding the labels, pen, and eraser. This provides for erasable labels but requires a special eraser. The eraser is prone to build up of the marking ink eventually resulting in incomplete erasure or smearing.

British Patent No. 2,190,631, issued to Weil on Nov. 25, 1987, describes an erasable label for attachment to video cassettes in which a two part window is attached to the cassette and the information is written onto two strips of material which generate an image when pressed together. Erasure is accomplished by separating the two strips with a cursor slid between the strips (a "magnetic slate" approach).

U.S. Pat. No. 4,589,685, issued to Lazar on May 20, 1986, describes a readily changeable labelling system employing a "magic slate" approach. The patent also describes an alternative embodiment which utilizes a protected easily erasable surface. The embodiment utilizing an easily erasable surface is based on a label formed from a slick plastic, vinyl, "Formica", porcelain enamel or other surface, and a standard felt tip pen or other erasable marker is used. Once the surface is written on, it is protected by a protective sheet (such as plastic) until it is to be erased.

U.S. Pat. No. 4,813,711, issued to Bohlman on Mar. 21, 1989, describes an index system which is cross-referenced to a permanent number printed on a blank cassette or other item to be marked. The entry on the index system is then erased and replaced when the program material is changed.

British Patent No. 2,055,702, issued to Squires on Mar. 11, 1981, describes a video-cassette box which has a pad on which information can be written and then erased. The pad includes an erasing arrangement of the "magic slate" kind by which the pad can be wiped clean partially or completely when the tape is recorded.

U.S. Pat. No. 4,884,827, issued to Kelley on Dec. 5, 1989, describes a partially transparent label for use on test tubes or collection tubes.

U.S. Pat. No. 4,507,883, issued to Tarrant on Apr. 2, 1985, describes a computer diskette labeling system using pressure sensitive labels. Identically coded labels are applied to the diskette and diskette jacket so that the correct diskette is returned to its corresponding jacket.

U.S. Pat. No. 4,674,771, issued to Thompson II on June 23, 1987, describes a pressure sensitive pharmaceutical label which cannot be removed with steam or water from a container once the label is applied.

Although the foregoing patents address some of the various needs of the industry, the devices and methods described in those patents do not provide for re-usable labels in which the identifying markings are smear-proof when touched by human hands and which can be erased with a damp cloth or paper towel.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

This invention pertains to a method and apparatus for marking identifying information on labels in a manner where the identifying information is highly resistant to accidentally erasure, is not indelibly marked, and can be erased by using a damp cloth or paper towel.

By way of example and not of limitation, the invention comprises durable, reusable, self adhesive vinyl labels, and a marking pen of the type which is used for marking overhead transparencies, glass, china, metal and plastics.

An object of the invention is to mark information on labels in a manner which is erasable.

Another object of the invention is to mark information on labels in a way that the marking is highly resistant to accidental erasure.

Another object of the invention is provide for erase of the information with a damp cloth or paper towel.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE PREFERRED EMBODIMENTS

Figure 1:
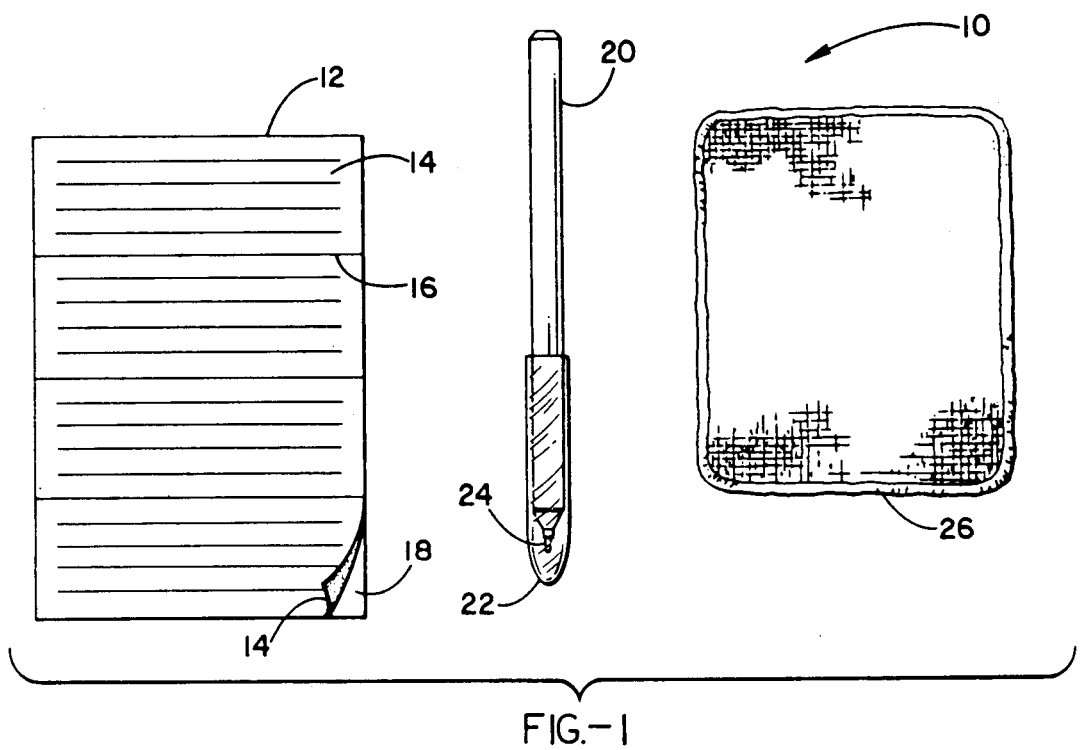
FIG. 1 is a perspective view of the invention showing various components thereof.

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

FIG. 1 shows the components of an erasable label kit 10 which can be used for placing identifying information on video cassettes, computer floppy disks, file folders and other items where the contents of the container are to be identified. The components of the kit include a plurality of flexible labels 14 which are coated with an adhesive on one surface and vinyl on the other surface. Vinyl labels 14 can be formed in a sheet 12 with separations 16 or they can be individual labels. Since vinyl labels 14 have a self adhesive coating on one side, they are attached to backing 18 prior to use to protect the adhesive coating. Backing 18 can be a waxed coated paper or similar material from which individual vinyl labels 14 can be peeled for application to the item to be marked.

Vinyl labels 14 should be durable since they will be re-used and should be flexible for application to surfaces which are not flat or which are non-uniform. It is essential that vinyl coated labels be used. Therefore, as an example only and not by way of limitation, vinyl labels 14 could be formed from Scotch ® Brand vinyl tape, series 23-2087-9 or similar material.

Marking pen 20 includes a writing point 24, and a plastic cap 22 which is placed over writing point 24 when not in use to prevent the ink contained in marking pen 20 from drying out. Writing point 24 is of a conventional shape and can be of a broad or fine width as required by the partial application. It is also essential that marking pen 20 be of the water soluble type so as not to make the marking permanent. A dry-erase type marker pen is not suitable because the marking will become permanent when applied to a vinyl label 14. As an example only and not by way of limitation, marking pen 20 can be a Vis-a-Vis ® Overhead Projector Pen of the type used for overhead transparencies, glass, china, metals, and plastics.

Figure 2:
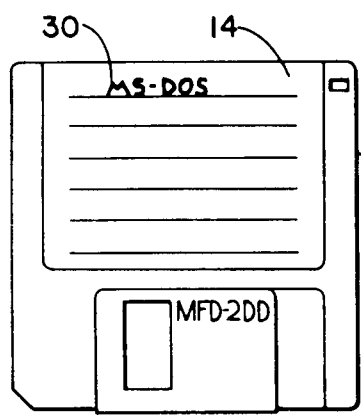
FIG. 2 is an elevational view of a computer floppy disk with a label from the invention placed thereon and identifying information written with the marking pen from the invention.
Figure 3:
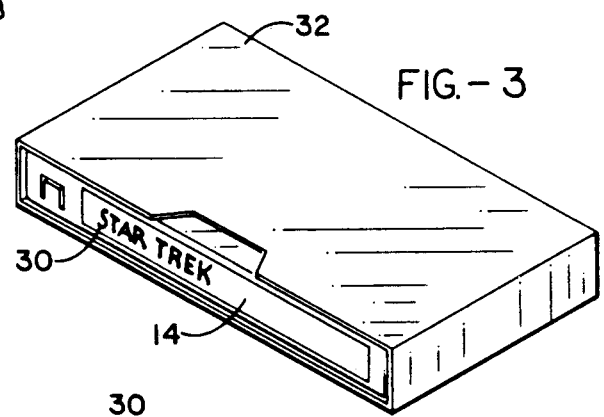
FIG. 3 is is a perspective view of a video cassette with a label from the invention placed thereon and identifying information written with the marking pen from the invention.
Figure 4:
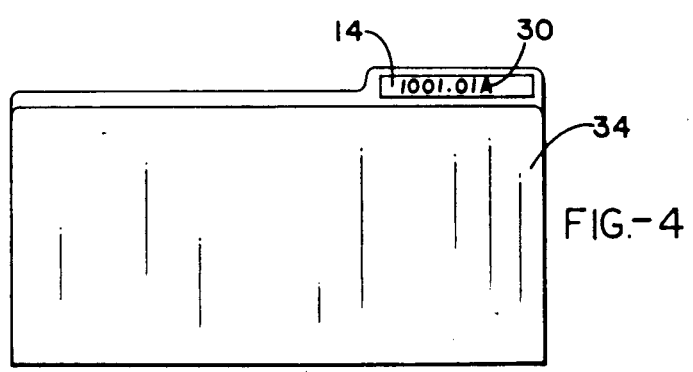
FIG. 4 is an elevational view of a file folder with a label from the invention placed thereon and identifying information written with the marking pen from the invention.

Referring to FIG. 2 through 4, vinyl label 14 can be applied to a computer floppy diskette 28, video cassette 32, file folder 34 or the like by peeling vinyl label 14 off of backing 18 and placing vinyl label 14 thereon. Identifying information 30 is placed on vinyl label 14 with marking pen 20. Since the ink in marking pen 20 is of a water soluble type, the identifying information 30 can be erased when desired by dampening cloth 26 with water and wiping off the identifying information.

The combination of vinyl label 14 and marking pen 20 has properties which are significant. The identifying information 30 which is placed on vinyl label 14 by marking pen 20 becomes smear-resistant, smudge-resistant, and highly resistant to accidental erasure when touched by human hands. Nevertheless, the identifying information can easily be erased with cloth 26 using only water as the solvent. Water solubility has the additional advantage of making cloth 26 easy to clean, unlike a dry-erase type marking kit which causes ink build up in the eraser leading to eventual smearing and necessity for disposal.

Accordingly, it will be seen that this invention can be used to marking identifying information on labels in a manner which is smear-resistant, smudge-resistant, and highly resistant to accidental erasure under normal handling, yet is erasable with a damp cloth or the like. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. An erasable label kit, comprising,
   (a) a plurality of reusable self-adhesive labels having a fist side and a second side, said first side having an adhesive coating and said second side having a non-adhesive vinyl coating;
   (b) a marking pen containing water soluble ink for placing identifying information on said second side of said labels, said ink when applied to said second side of said labels being smudge-resistant and smear-resistant and highly resistant to erasure under normal handling.

2. An erasable label kit as recited in claim 1, further comprising an eraser having cloth fabric for erasing said identifying information from said second side of said labels with water.

3. An erasable label kit as recited in claim 1, further comprising an eraser having a paper composition for erasing said identifying information from said second side of said labels with water.

4. An erasable label kit as recited in claim 1, further comprising a water absorbent eraser for erasing said identifying information from said second side of said labels with water.

5. An apparatus for marking identifying information on video cassettes, computer disks, and the like, comprising:
   (a) a plurality of flexible self-adhesive labels having a vinyl coated surface on which identifying information can be placed;
   (b) a marking pen containing water soluble ink for placing identifying information on said labels, said ink when applied to said second side of said labels being smudge-resistant and smear-resistant and highly resistant to erasure under normal handling.

6. An apparatus as recited in claim 5, further comprising an eraser having cloth fabric for erasing said identifying information from said labels with water.

7. An apparatus as recited in claim 5, further comprising an eraser having a paper composition for erasing said identifying information from said labels with water.

8. An apparatus as recited in claim 5, further comprising a water absorbent eraser for erasing said identifying information from said second side of said labels with water.

* * * * *